United States Patent
Sakata et al.

(10) Patent No.: US 11,806,617 B2
(45) Date of Patent: Nov. 7, 2023

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Shinpei Sakata, Tokyo (JP); Youichiro Miyake, Tokyo (JP); Gautier Boeda, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 13 days.

(21) Appl. No.: 17/545,660

(22) Filed: Dec. 8, 2021

(65) Prior Publication Data

US 2022/0176243 A1    Jun. 9, 2022

(30) Foreign Application Priority Data

Dec. 8, 2020 (JP) .................. 2020-203409

(51) Int. Cl.
*A63F 13/00* (2014.01)
*A63F 13/355* (2014.01)
*A63F 13/58* (2014.01)
*A63F 13/45* (2014.01)

(52) U.S. Cl.
CPC ............ *A63F 13/355* (2014.09); *A63F 13/45* (2014.09); *A63F 13/58* (2014.09)

(58) Field of Classification Search
CPC ............. G07F 17/3211; G07F 17/3209; G07F 17/3286
See application file for complete search history.

(56) References Cited

U.S. PATENT DOCUMENTS

| | | | | |
|---|---|---|---|---|
| 8,313,380 B2 * | 11/2012 | Zalewski | ............... | A63F 13/00 463/36 |
| 8,781,151 B2 * | 7/2014 | Marks | ................... | A63F 13/213 345/161 |
| 2005/0233793 A1 * | 10/2005 | Yamada | ................. | A63F 13/00 463/9 |

FOREIGN PATENT DOCUMENTS

| | | |
|---|---|---|
| JP | 2002095865 A | 4/2002 |
| JP | 5581232 B2 | 7/2014 |
| JP | 2017209574 A | 11/2017 |

(Continued)

OTHER PUBLICATIONS https://youtu.be/jYWJt9LPXfc Clash of Clans Walkthrough (Year: 2020).*

(Continued)

*Primary Examiner* — David L Lewis
*Assistant Examiner* — Eric M Thomas
(74) *Attorney, Agent, or Firm* — Dorsey & Whitney LLP

(57) ABSTRACT

A non-transitory computer-readable medium including a video game processing program for causing a server to perform functions to control a character in progress of a video game is provided. The functions includes: a utilization permitting function configured to permit utilization of object property information for controlling the character, a property of an object being expressed in the object property information, the property of the object being stored in a specific storage region associated with the object as a first storage region; and an information utilizing function configured to utilize the object property information, whose utilization is permitted, for controlling the character.

15 Claims, 13 Drawing Sheets

(56) References Cited

FOREIGN PATENT DOCUMENTS

JP       2018173993 A    11/2018
JP       2020163108 A    10/2020

OTHER PUBLICATIONS

[English Translation] Notice of Reasons for Refusal dated Jan. 25, 2022 for Japanese Patent Application No. 2020-203409.
"Knives Out What is Emote? Introductions of Methods of Performing, Purchasing, and Setting", [English Translation] Information of Knives Out and PUBG [online], URL:<https://pubg.v-ys.com/kouya-emote>, May 1, 2019.

* cited by examiner

Fig. 13

OBJECT PROPERTY RELATED INFORMATION

| OBJECT NAME | FIRST STORAGE REGION | | | | | | | |
|---|---|---|---|---|---|---|---|---|
| | DEDICATED TAG | NORMAL TAG | | | | | | |
| APPLE A | APPLE | SWEET | RED | ROUND | | | | |
| CLOTHES | CLOTHES | FABRIC | BURN | WARM | | | | |
| FOREST | FOREST | TREE | GRASS | WIND | GREEN | SUNSHINE FILTERING THROUGH FOLIAGE | INSECT | DIRT |
| APPLE B | APPLE | SWEET | SWEET | SWEET | RED | FRAGRANT SMELL | ROUND | RIVER |
| ... | ... | ... | ... | ... | ... | ... | ... | ... |

Fig. 14A

CHARACTER SHORT-TERM MEMORY RELATED INFORMATION

| CHARACTER NAME | TAG 1 | TAG 2 | TAG 3 | TAG 4 | TAG 5 | TAG 6 | TAG 7 | TAG 8 |
|---|---|---|---|---|---|---|---|---|
| CHARACTER A | FABRIC | BURN | GRASS | SWEET | WARM | GREEN | APPLE | RED |
| ... | ... | ... | ... | ... | ... | ... | ... | ... |

Fig. 14B

CHARACTER LONG-TERM MEMORY RELATED INFORMATION

| CHARACTER NAME | TAG 1 | | TAG 2 | | TAG 3 | | TAG 4 | | TAG N | |
|---|---|---|---|---|---|---|---|---|---|---|
| CHARACTER A | FABRIC | 1 | TOMATO | 4 | BURN | 2 | COOL | 0 | ROUND | 1 |
| ... | ... | ... | ... | ... | ... | ... | ... | ... | ... | ... |

Fig. 17A

| APPLE | | | |
|---|---|---|---|
| SWEET | RED | FRAGRANT SMELL | ROUND |

Fig. 17B

| TOPIC NAME | TAG | | | |
|---|---|---|---|---|
| HARVEST FESTIVAL | APPLE | MANDARINE ORANGE | GRAPE | |
| MAILBOX | RED | POST | LETTER | |
| BALLOON | RED | ROUND | FLY | |
| WEATHER | GOOD WEATHER | CLOUDINESS | RAIN | THUNDER |
| COOKING | FRAGRANT SMELL | DELICIOUS | HUNGRY | |
| CATCH | ROUND | WHITE | BASEBALL | THROUGH |
| DOG | BOWBOW | ANIMAL | TAIL | |

NON-TRANSITORY COMPUTER-READABLE MEDIUM AND VIDEO GAME PROCESSING SYSTEM

CROSS-REFERENCE TO RELATED APPLICATION

The present application claims priority to and the benefit of Japanese Patent Application No. 2020-203409 filed on Dec. 8, 2020, the disclosure of which is expressly incorporated herein by reference in its entirety for any purpose.

BACKGROUND

At least one of embodiments of the present disclosure relates to a non-transitory computer-readable medium including a video game processing program and a video game processing system for causing a server to perform functions to control a character in progress of a video game.

Conventionally, a video game has been caused to proceed by causing a character in the video game and controlling the character.

For example, Japanese Patent Application Publication No. 2002-95865 discloses a system in which a video game is caused to proceed by automatically operating a character.

SUMMARY in the meantime, in a video game, a property of an object may influence on control of the character. In other words, in the video game, the character may be controlled on the basis of information regarding the property of the object. For example, it can be considered that a character is caused to recognize an object and take an action according to a property of the object.

Here, the information regarding the property of the object is set as flag information for each object by developers. The flag information needs to be set for each type of properties that appear in the video game for one object. For that reason, as the number of objects and the number of types of properties in the video game increase, the burden of setting flag information by developers and the burden of managing the flag information by the developers when any property of the any object is utilized in order to have the variety of progress of the video game has increased.

It is an object of at least one of embodiments of the present disclosure to solve the problem described above, and to reduce the burden on developers when information regarding a property of an object in a video game is set and utilized.

According to one non-limiting aspect of the present disclosure, there is provided a non-transitory computer-readable medium including a video game processing program for causing a server to perform functions to control a character in progress of a video game.

The functions include a utilization permitting function configured to permit utilization of object property information for controlling the character, a property of an object being expressed in the object property information, the property of the object being stored in a specific storage region associated with the object as a first storage region.

The functions also include an information utilizing function configured to utilize the object property information, whose utilization is permitted, for controlling the character.

According to another non-limiting aspect of the present disclosure, there is provided a video game processing system for controlling progress of a video game in response to an operation of a user. The video game processing system includes a communication network, a server, and the user terminal.

The video game processing system includes a utilization permitter configured to permit utilization of object property information for controlling the character, a property of an object being expressed in the object property information, the property of the object being stored in a specific storage region associated with the object as a first storage region.

The video game processing system also includes an information utilizer configured to utilize the object property information, whose utilization is permitted, for controlling the character.

According to still another non-limiting aspect of the present disclosure, there is provided a non-transitory computer-readable medium including a video game processing program for causing a user terminal to perform functions to control progress of a video game in response to an operation of a user.

The functions include a utilization permitting function configured to permit utilization of object property information for controlling the character, a property of an object being expressed in the object property information, the property of the object being stored in a specific storage region associated with the object as a first storage region.

The functions also include an information utilizing function configured to utilize the object property information, whose utilization is permitted, for controlling the character.

According to each of the embodiments of the present application, one or two or more shortages are solved.

BRIEF DESCRIPTION OF DRAWINGS

The foregoing and other objects, features and advantages of the present disclosure will become more readily apparent from the following detailed description of preferred embodiments of the present disclosure that proceeds with reference to the appending drawings:

FIG. 13 is an explanatory table for explaining an example of a storage state of information corresponding to at least one of the embodiments of the present disclosure;

FIGS. 14A and 14B are explanatory tables for explaining another example of a storage state of information corresponding to at least one of the embodiments of the present disclosure;

FIGS. 17A and 17B are explanatory tables showing another example of game processing corresponding to at least one of the embodiments of the present disclosure.

DETAILED DESCRIPTION

Hereinafter, examples of embodiments according to the present disclosure will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
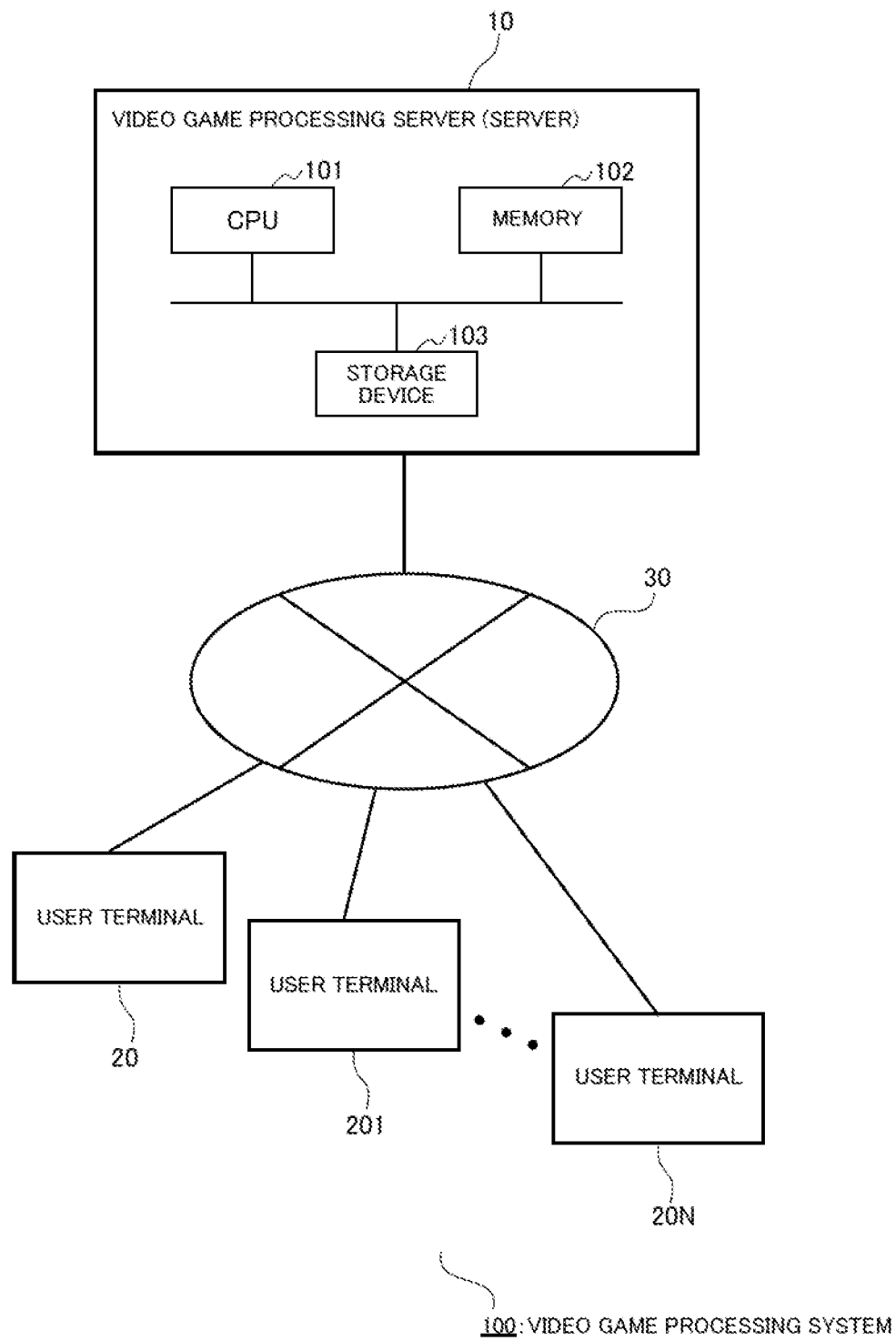
FIG. 1 is a block diagram illustrating an example of a configuration of a video game processing system corresponding to at least one of the embodiments of the present disclosure.

FIG. 1 is a block diagram illustrating an example of a configuration of a video game processing system 100 according to one embodiment of the present disclosure. As illustrated in FIG. 1, the video game processing system 100 includes a video game processing server 10 (hereinafter, referred to as a "server 10") and user terminals 20, and 201 to 20N ("N" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20N is connected to a communication network 30 such as the Internet. In this regard, although it is not illustrated in the drawings, the plurality of user terminals 20 and 201 to 20N is connected to the communication network 30 by executing data communication with base stations managed by a telecommunication carrier by means of a radio communication line.

The video game processing system 100 includes the server 10 and the plurality of user terminals 20 and 201 to 20N, whereby various kinds of functions for executing various kinds of processing in response to an operation of the user are performed.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. A configuration of the server 10 is not limited particularly so long as the server 10 includes a general configuration for executing various kinds of processes as a computer, such as a control unit and a communication unit. Hereinafter, an example of a hardware configuration of the server 10 will be described briefly.

As illustrated in FIG. 1, the server 10 at least includes a CPU (Central Processing Unit) 101, a memory 102, and a storage device 103.

The CPU 101 is a central processing unit configured to execute various kinds of calculations and controls. Further, in a case where the server 10 includes a GPU (Graphics Processing Unit), a part of the various kinds of calculations and controls may be executed by the GPU. The server 10 appropriately executes, by the CPU 101, various kinds of information processing required to control a video game by using data read out onto the memory 102, and stores obtained processing results in the storage device 103 as needed.

The storage device 103 has a function as a storage medium for storing various kinds of information. A configuration of the storage device 103 is not limited particularly. However, it is preferable that the storage device 103 is configured so as to be capable of storing all of the various kinds of information required to control the video game from the viewpoint of reducing a processing load on each of the plurality of user terminals 20 and 201 to 20N. As such examples, there are an HDD and an SSD. However, a storage unit for storing the various kinds of information may be provided with a storage region in a state that the server 10 can access the storage region, for example, and may be configured so as to have a dedicated storage region outside the server 10.

Figure 2:
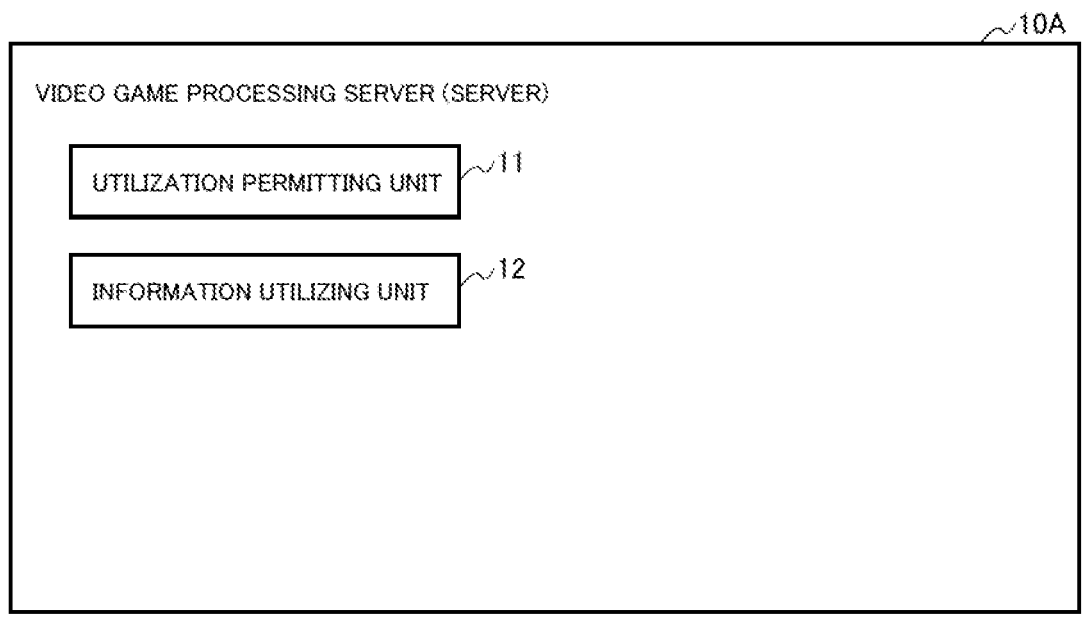
FIG. 2 is a block diagram illustrating a configuration of a server corresponding to at least one of the embodiments of the present disclosure.

FIG. 2 is a block diagram illustrating a configuration of a video game processing server 10A (hereinafter, referred to as a "server 10A"), which is an example of the configuration of the server 10. As illustrated in FIG. 2, the server 10A at least includes a utilization permitting unit 11 and an information utilizing unit 12.

The utilization permitting unit 11 has a function to permit utilization of object property information for controlling a character. A property of an object, which is stored in a specific storage region (hereinafter, referred to as a "first storage region") associated with the object, is expressed in the object property information.

Here, the object means a virtual object that appears in the video game. The object is not limited particularly. A single object may be treated as the object, or a collection of a plurality of objects may be treated as the object. As examples of the object composed of the single object, there are items such as a sword and a torch and natural objects such as a tree and a rock. As an example of the object composed of the plurality of objects, there is one that is named as a collection (for example, a forest as a collection of trees).

Further, the first storage region means a specific storage region that is associated with an object and in which object property information can be stored. A configuration to store the object property information in the storage region is not limited particularly. However, it is preferable that the first storage region is configured to store object property information in a predetermined storage region in an information format according to each storage region.

Further, the object property information means information in which a property of an object is expressed, and is stored in a first storage region associated with each object. Further, the property of the object means a feature possessed by an object. The property of the object is not limited particularly. The property of the object may be a material feature of the object, or may be one that indicates an action that can be carried out for the object. As examples of the material feature of the object, there are a shape, color, taste, and a state change of the object. As an example of the action that can be carried out for the object, there is an action that targets an object by a character (for example, "throw", "eat", and "shake"). Further, the information in which the property is expressed means information that objectively indicates a property. The information in which the property is expressed is not limited particularly. Such information may be information in which a property is directly expressed, or information in which a property is indirectly expressed. As examples of the information in which the property is expressed, there are character string information that indicates a property and identification information assigned for each property.

Further, the character means something that appears in the video game to take an action. The character includes something that takes an action on the basis of a user operation and something that autonomically takes an action regardless of a user operation. In particular, the character in the present embodiment is a character that autonomically takes an action regardless of a user operation. The character that autonomically takes an action is not limited particularly. Such a character may be a non-player character (NPC) that does not completely receive an operation of the user in the video game, or may be a character that receives an operation of the user in a partial status and does not receive an operation of the user in the other status. As an example of the character that autonomically takes an action, there is one that autonomically recognizes object(s) around it, and makes a decision to take an action against any object.

Further, the utilization of the object property information for controlling the character means that the object property information is utilized in a process of controlling the character. The utilization of the object property information for controlling the character is not limited particularly. In such utilization, the object property information may be utilized for determining an action to be carried out by the character, or may be utilized for updating a determination criterion regarding the control of the character. As an example of the utilization of the object property information for controlling the character, there is determination of an action using an item by the character.

The information utilizing unit 12 has a function to utilize the object property information, whose utilization is permitted, for controlling the character.

Here, timing when the object property information is utilized is not limited particularly. Various timings can be considered so long as each timing is a time when the character takes an action after the utilization of the object property information is permitted. Namely, timing to utilize the object property information may be timing immediately after a process of permitting the utilization of the object property information, or may be necessary timing after that.

Each of the plurality of user terminals 20, and 201 to 20N is managed by the user, and is configured by a communication terminal capable of playing a network delivery type game, such as a cellular telephone terminal, a PDA (Personal Digital Assistants), a portable game apparatus, or a so-called wearable device, for example. In this regard, the configuration of the user terminal that the video game processing system 100 can include is not limited to the example described above. Each of the user terminals 20, and 201 to 20N may be configured so that the user can recognize the content of the video game. As the other examples of the user terminal, there are one obtained by combining various kinds of communication terminals, a personal computer, and a stationary game apparatus.

Further, each of the plurality of user terminals 20, and 201 to 20N is connected to the communication network 30, and includes hardware (for example, a display device for displaying a browser screen or a game screen based on a coordinate and the like) and software for executing various kinds of processes by communicating with the server 10A. In this regard, each of the plurality of user terminals 20, and 201 to 20N may be configured so as to be able to directly communicate with each other without the server 10A.

Next, an operation of the video game processing system 100 (hereinafter, referred to as the "system 100") according to the present embodiment will be described.

Figure 3:
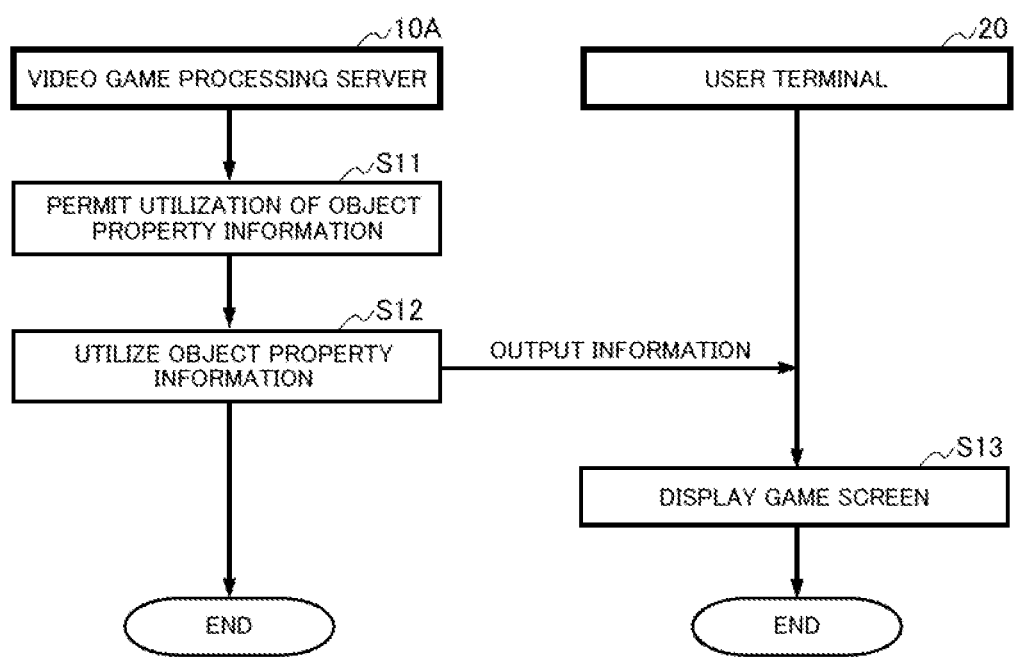
FIG. 3 is a flowchart illustrating an example of game processing corresponding to at least one of the embodiments of the present disclosure.

FIG. 3 is a flowchart illustrating an example of game processing executed by the system 100. In the game processing according to the present embodiment, processes related to a control of progress of the video game in response to an operation of the user of the user terminal 20 (hereinafter, referred to as the "terminal 20") are executed. Hereinafter, a case where the server 10A and the terminal 20 execute the game processing will be described as an example.

The game processing is started in a case where the terminal 20 displays an input screen for a condition, for example.

In the game processing, the server 10A first permits utilization of object property information, which is stored in a first storage region, for controlling a character (Step S11). In the present embodiment, in a case where the character finds an object, the server 10A permits utilization of object property information, which is associated with the object and stored in the first storage region, for controlling the character.

When the utilization of the object property information is permitted, the server 10A utilizes the object property information whose utilization is permitted for controlling the character (Step S12). In the present embodiment, the server 10A utilizes the object property information for action processing of the character against the object for which the utilization of the object property information is permitted. Further, the server 10A transmits, to the terminal 20, output information regarding the utilization of the object property information.

When the output information is received from the server 10A, the terminal 20 outputs a game screen to a display screen of a predetermined display device (Step S13). In the present embodiment, when the terminal 20 outputs the game screen, the server 10A and the terminal 20 terminate the processes herein.

Figure 4:
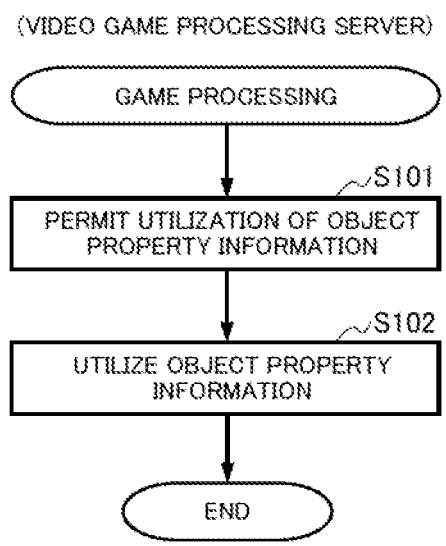
FIG. 4 is a flowchart illustrating an example of an operation of a server side in the game processing corresponding to at least one of the embodiments of the present disclosure.

FIG. 4 is a flowchart illustrating an example of an operation of the server 10A side in the game processing. Here, an operation of the server 10A in the system 100 will be described again.

In the game processing, the server 10A first permits utilization of object property information, which is stored in a first storage region, for controlling a character (Step S101), and utilizes the object property information whose utilization is permitted for controlling the character (Step S102). When the object property information is utilized for controlling the character, the server 10A terminates the processes herein.

Figure 5:
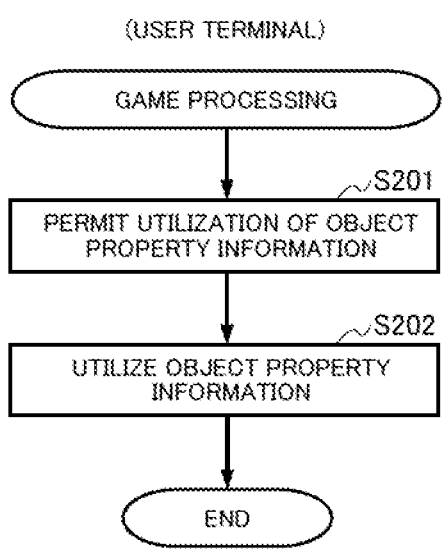
FIG. 5 is a flowchart illustrating an example of an operation of a terminal side in the game processing corresponding to at least one of the embodiments of the present disclosure.

FIG. 5 is a flowchart illustrating an example of the terminal 20 side in a case where the terminal 20 executes the game processing. Hereinafter, a case where the terminal 20 executes the game processing by a single body will be described as an example. In this regard, the configuration of the terminal 20 includes the similar functions to those of the server 10A except that the terminal 20 receives various kinds of information from the server 10A. For this reason, its explanation is omitted from a point of view to avoid repeated explanation.

In the game processing, the terminal 20 first permits utilization of object property information, which is stored in a first storage region, for controlling a character (Step S201), and utilizes the object property information whose utilization is permitted for controlling the character (Step S202). When the object property information is utilized for controlling the character, the terminal 20 terminates the processes herein.

As explained above, as one side of the first embodiment, the server 10A that controls progress of the video game is configured so as to at least include the utilization permitting unit 11 and the information utilizing unit 12. Thus, the utilization permitting unit 11 permits the utilization of the object property information, in which the property of the object that is stored in the specific storage region (the first storage region) associated with the object is expressed, for controlling the character; and the information utilizing unit 12 utilizes the object property information, whose utilization is permitted, for controlling the character. Therefore, it becomes possible to reduce the burden on developers when setting and utilizing information regarding the property of the object in the video game.

Namely, since properties (or attributes) that the object may have are set in advance by the developers, it is not necessary to set whether each object has each of the properties or not. Therefore, it becomes possible to facilitate setting and management regarding the property of the object. Moreover, it becomes possible for the developers to easily extend the video game using the object property information without considering the entire object property information that appears in the video game. In addition, it becomes possible to cause progress of the video game using the object property information to exceed expectation of the developers (that is, it is possible for the user to obtain results of progress of the video game, which exceeds the number of results that the developers can manage).

Second Embodiment

Figure 6:
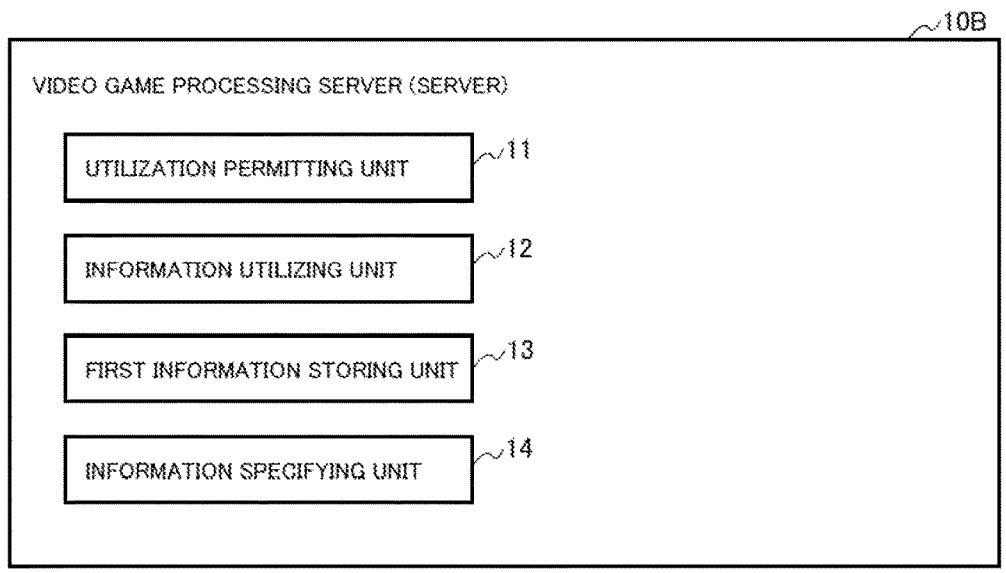
FIG. 6 is a block diagram illustrating a configuration of a server corresponding to at least one of the embodiments of the present disclosure.

FIG. 6 is a block diagram illustrating a configuration of a video game processing server 10B (hereinafter, referred to as a "server 10B"), which is an example of the video game processing server 10. In the present embodiment, the server 10B at least includes a utilization permitting unit 11, an information utilizing unit 12, a first information storing unit 13, and an information specifying unit 14.

The first information storing unit 13 has a function to store object property information, whose utilization is permitted, in a specific storage region associated with a character (hereinafter, referred to as a "second storage region").

Here, the second storage region means a specific storage region that is associated with a character, and in which the object property information can be stored. The second storage region is associated with each character, for example.

Further, the object property information stored in the second storage region is not limited particularly. However, it is preferable that the object property information is object property information stored in a first storage region associated with an object that satisfies a predetermined storage condition. In that case, the first information storing unit 13 may be configured so that utilization of the object property information stored in the first storage region associated with the object that satisfies the predetermined storage condition is permitted. The storage condition is not limited particularly. However, it is preferable that the predetermined storage condition is a condition regarding a relationship between the character and the object. As an example of the storage condition, there is a condition that a character recognizes an object (that is, a recognition condition). As examples of the recognition condition, there are a condition that an object can be visually recognized from a position of a character, a condition that a distance between a character and an object is a predetermined distance or shorter, and a condition that a character possesses an object.

The information specifying unit 14 has a function to specify object property information to be utilized for controlling a character from at least one kind of object property information stored in the second storage region.

Here, a configuration to specify the object property information is not limited particularly. However, it is preferable that the information specifying unit 14 is configured so as to specify the object property information on the basis of information regarding a status of the character. As an example of the configuration to specify the object property information, there is a configuration in which the same object property information as object property information stored in a first storage region associated with an object that has a predetermined relationship with a character is set to a specification target.

Figure 7:
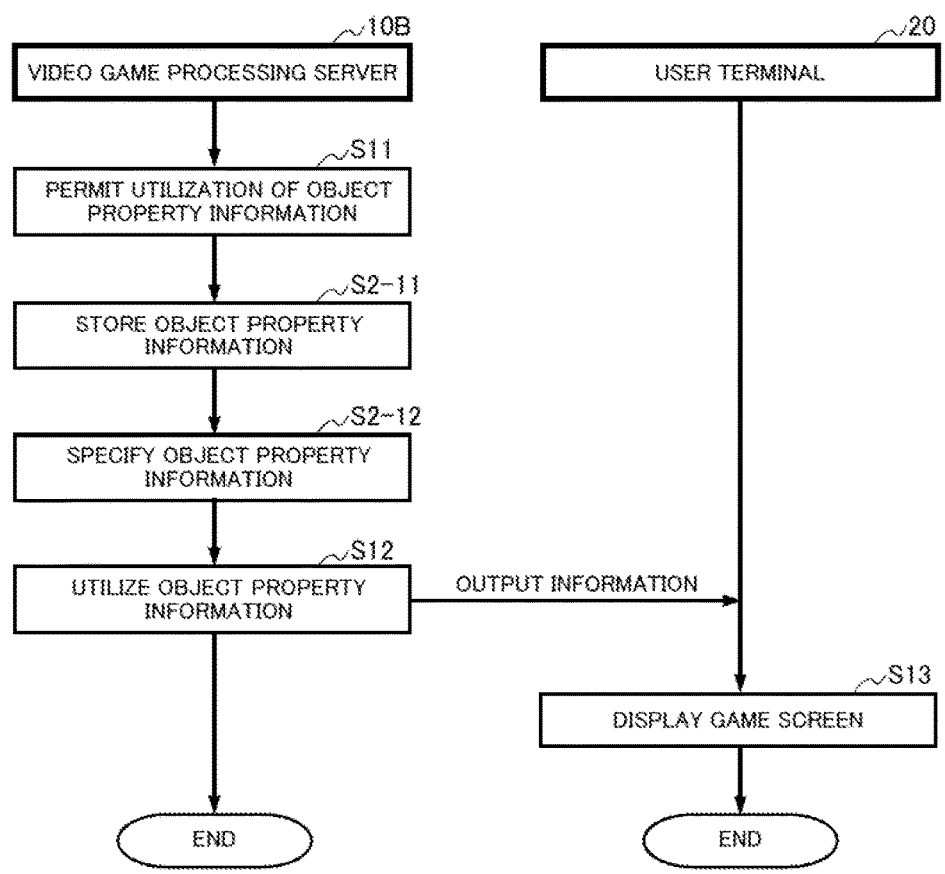
FIG. 7 is a flowchart illustrating an example of game processing corresponding to at least one of the embodiments of the present disclosure.

FIG. 7 is a flowchart illustrating an example of game processing executed by a video game processing system 100. Hereinafter, operations of the server 10B and a user terminal 20 (hereinafter, referred to as a "terminal 20") will be described as an example. In this regard, a flowchart illustrating an operation of each of the server 10B and the terminal 20 is omitted from a point of view to avoid repeated explanation.

When utilization of object property information is permitted, the server 10B stores the object property information whose utilization is permitted in a specific storage region associated with a character (that is, a second storage region) (Step S2-11). In the present embodiment, the server 10B stores object property information on an object that satisfies a predetermined storage condition.

When the object property information is stored, the server 10B specifies object property information to be utilized for controlling the character from at least one kind of object property information stored in the second storage region (Step S2-12). In the present embodiment, the server 10B specifies the same object property information as object property information stored in a first storage region associated with an object that satisfies a recognition condition.

As explained above, as one side of the second embodiment, the server 10B that controls progress of the video game in response to the operation of the user is configured so as to at least include the utilization permitting unit 11, the information utilizing unit 12, the first information storing unit 13, and the information specifying unit 14. Thus, the first information storing unit 13 stores object property information, whose utilization is permitted, in the specific storage region associated with the character (that is, the second storage region); and the information specifying unit 14 specifies the object property information to be utilized for controlling the character from at least one kind of object property information stored in the second storage region. Therefore, it becomes possible to reproduce a mechanism of memory of human, and this makes it possible to realize a more tasteful character control.

Third Embodiment

Figure 8:
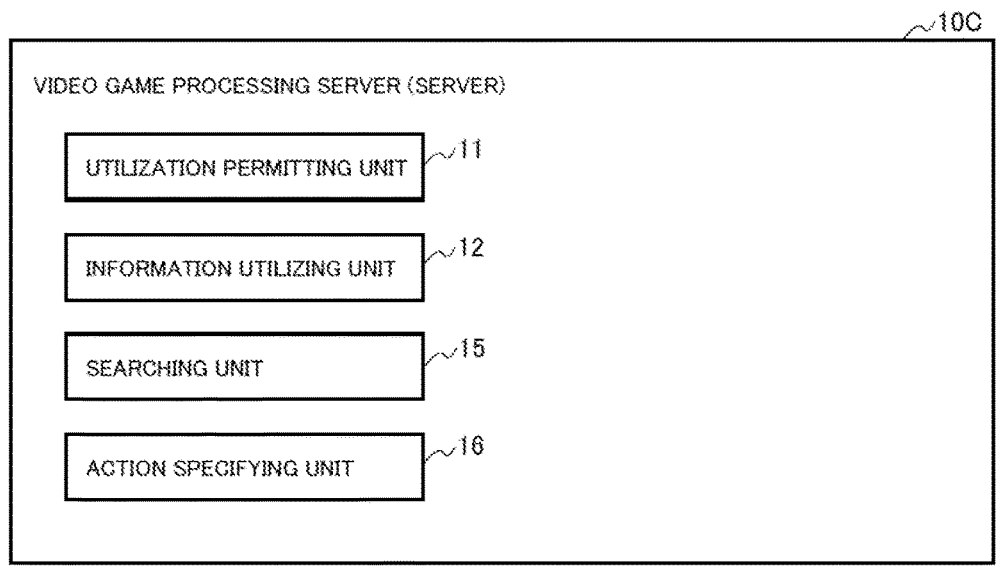
FIG. 8 is a block diagram illustrating a configuration of a server corresponding to at least one of the embodiments of the present disclosure.

FIG. 8 is a block diagram illustrating a configuration of a video game processing server 10C (hereinafter, referred to as a "server 10C"), which is an example of the video game processing server 10. In the present embodiment, the server 10C at least includes a utilization permitting unit 11, an information utilizing unit 12, a searching unit 15, and an action specifying unit 16.

The searching unit 15 has a function to search action content associated with object property information whose utilization is permitted among plural kinds of action content on the basis of action content related information in which information indicating action content of a character and corresponding object property information are associated with each other.

Here, the action content related information means information in which action content of a character and information indicating a property related to an action indicated by the action content, for example, a property of a certain object are associated with each other. The action content related information is not limited particularly. However, it is preferable that information indicating the action content of the character is associated with the object property information in a one-to-plural relationship in the action content related information. In this regard, each kind of the object property information in the action content related information is any of plural kinds of object property information of the object that appears in a video game.

Further, the action content of the character means a type of action that the character can carry out. The action content of the character is not limited particularly. The action content of the character the object may be one indicating an action, or may be a type of action that does not involve the action of the character. As examples of the action that does not involve the action of the character, there are conversation by characters, a comment made by a character in the video game.

Further, the phrase "search action content on the basis of action content related information" means that information indicating action content of a character associated with object property information that satisfies a predetermined search condition is searched. A configuration to search action content on the basis of action content related information is not limited particularly. However, it is preferable that the searching unit 15 is configured so as to search action content further on the basis of object property information of an object that has a predetermined relationship with the character. As an example of such a configuration, there is a configuration in which information indicating action content of a character associated with the same object property information as the object property information of the object that has the predetermined relationship with the character is searched.

The action specifying unit 16 has a function to specify the searched action content as the content of the action that the character is caused to carry out.

Figure 9:
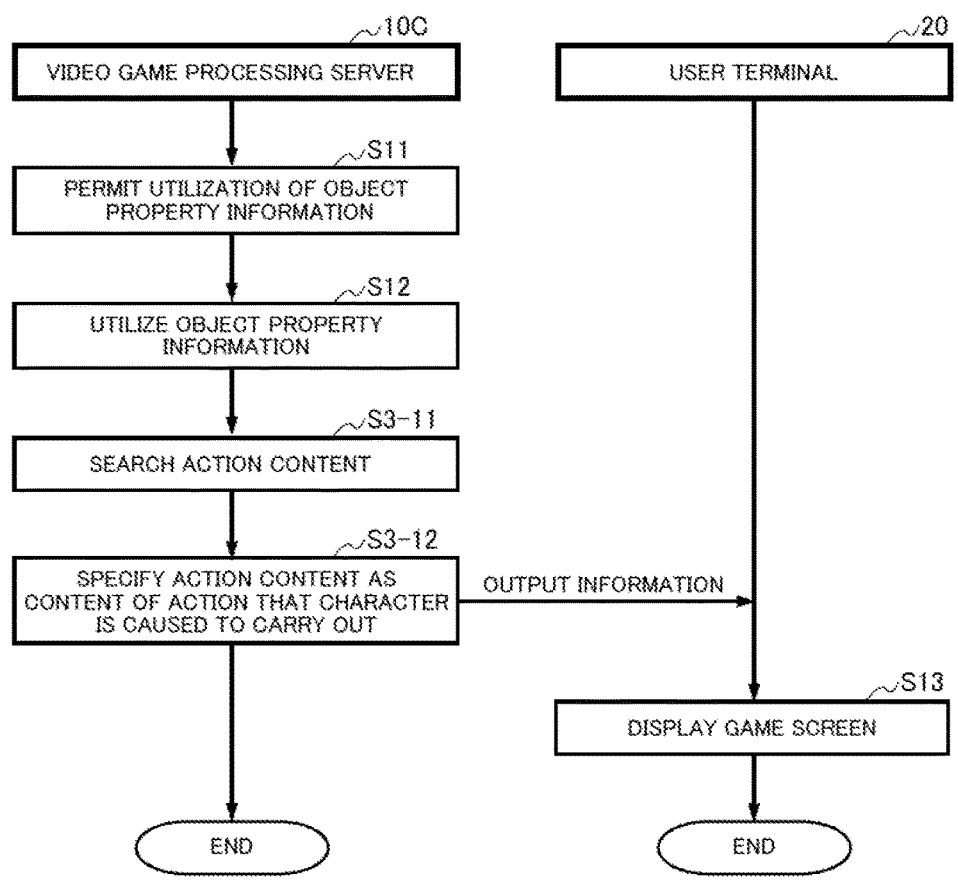
FIG. 9 is a flowchart illustrating an example of game processing corresponding to at least one of the embodiments of the present disclosure.

FIG. 9 is a flowchart illustrating an example of game processing executed by a video game processing system 100. Hereinafter, operations of the server 10C and a user terminal 20 (hereinafter, referred to as a "terminal 20") will be described as an example. In this regard, a flowchart illustrating an operation of each of the server 10C and the terminal 20 is omitted from a point of view to avoid repeated explanation.

When object property information is utilized, the server 10C searches action content associated with the object property information whose utilization is permitted from plural kinds of action content on the basis of action content related information with which information indicating action content of a character and the object property information are associated (Step S3-11). In the present embodiment, the server 10C searches information indicating the action content of the character associated with the same object property information as object property information of an object that satisfies a recognition condition of the character.

When the action content is searched, the server 10C specifies the searched action content as the content of an action that the character is caused to carry out (Step S3-12). In the present embodiment, the server 10C transmits, to the terminal 20, output information regarding utilization of the object property information.

As explained above, as one side of the third embodiment, the server 10C that controls progress of the video game in response to the operation of the user is configured so as to at least include the utilization permitting unit 11, the information utilizing unit 12, the searching unit 15, and the action specifying unit 16. Thus, the searching unit 15 searches the action content associated with the object property information whose utilization is permitted among the plural kinds of action content on the basis of the action content related information in which the information indicating the action content of the character and the corresponding object property information are associated with each other; and the action specifying unit 16 specifies the searched action content as the content of the action that the character is caused to carry out. Therefore, it becomes possible to improve interest of the user in the video game by causing the content of action that the character is caused to carry out to have the variety.

Fourth Embodiment

Figure 10:
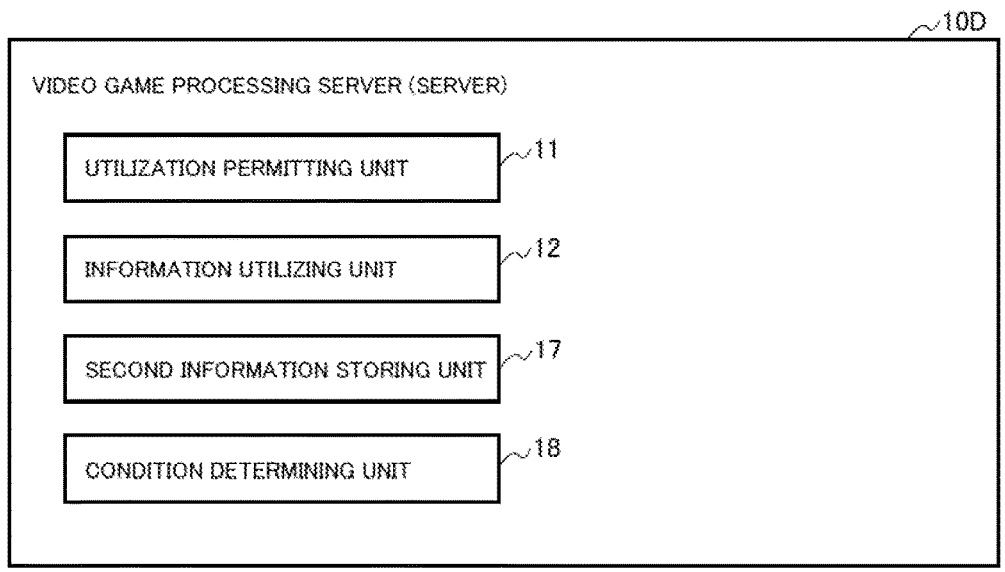
FIG. 10 is a block diagram illustrating a configuration of a server corresponding to at least one of the embodiments of the present disclosure.

FIG. 10 is a block diagram illustrating a configuration of a video game processing server 10D (hereinafter, referred to as a "server 10D"), which is an example of the video game processing server 10. In the present embodiment, the server 10D at least includes a utilization permitting unit 11, an information utilizing unit 12, a second information storing unit 17, and a condition determining unit 18.

The second information storing unit 17 has a function to store progress status information, in which a status of progress of a video game based on control of a character is expressed, in a specific storage region associated with a progress status (hereinafter, referred to as a "fifth storage region").

Here, the progress status information is information in which the status of progress of the video game is express, and means information objectively indicating a progress status of the video game. The progress status information is not limited particularly. However, the progress status information may be information in which the progress status of the video game is expressed directly, or may be information in which the progress status of the video game is expressed indirectly. As examples of information in which the progress status of the video game is expressed indirectly, there are information indicating an object used for progress of the video game (for example, an item), and information that explains the progress status of the video game. In this regard, the progress status information may be information that is treated as object property information. In that case, the object property information is stored in the fifth storage region as the progress status information.

Further, the status of progress of the video game is not limited particularly. The status of progress of the video game may be a status of progress in the entire video game corresponding to each user, or may be a status of progress of an event that occurs in the video game.

Further, the fifth storage region means a specific storage region that is associated with a progress status and can store predetermined information therein. A configuration to store the information in the fifth storage region is not limited particularly. However, it is preferable that the second information storing unit 17 is configured so as to store the predetermined information in a predetermined storage region in an information format corresponding to the fifth storage region.

The condition determining unit 18 has a function to determine whether a progress condition regarding progress of the video game is satisfied or not on the basis of the progress status information stored in the fifth storage region.

Here, the progress condition is not limited particularly. However, it is preferable that the progress condition is a condition that predetermined progress status information is stored in the fifth storage region. As an example of the progress condition, there is a condition that part or all of plural kinds of predetermined progress status information defined in advance is stored in the fifth storage region. In this regard, it is preferable that the progress condition is a condition in which the video game proceeds in an advantageous manner for the character by satisfying the progress condition. As examples of the configuration in which the video game proceeds in the advantageous manner for the character, there are a configuration in which the entire video game proceeds so as to be cleared, and a configuration in which an event that occurs in the video game proceeds.

Figure 11:
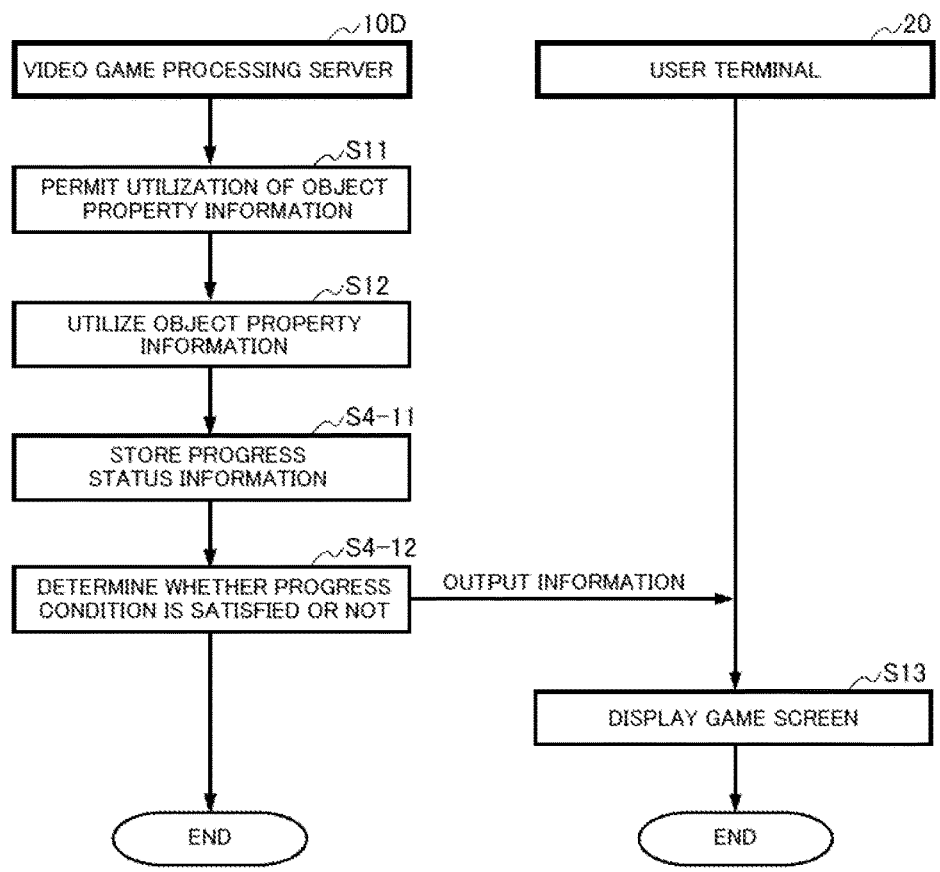
FIG. 11 is a flowchart illustrating an example of game processing corresponding to at least one of the embodiments of the present disclosure.

FIG. 11 is a flowchart illustrating an example of game processing executed by a video game processing system 100. Hereinafter, operations of the server 10D and a user terminal 20 (hereinafter, referred to as a "terminal 20") will be described as an example. In this regard, a flowchart illustrating an operation of each of the server 10D and the terminal 20 is omitted from a point of view to avoid repeated explanation.

When object property information is utilized, the server 10D stores progress status information, in which a status of progress of the video game based on control of a character is expressed, in a specific storage region associated with a progress status (that is, a fifth storage region) (Step S4-11). In the present embodiment, the server 10D stores predetermined information in a predetermined storage region in an information format according to the fifth storage region.

When the progress status information is stored in the fifth storage region, the server 10D determines whether a progress condition regarding progress of the video game is satisfied or not on the basis of the progress status information stored in the fifth storage region (Step S4-12). In the present embodiment, the server 10D transmits, to the terminal 20, output information regarding utilization of the object property information.

As explained above, as one side of the fourth embodiment, the server 10D that controls progress of the video game in response to the operation of the user is configured so as to at least include the utilization permitting unit 11, the information utilizing unit 12, the second information storing unit 17, and the condition determining unit 18. Thus, the second information storing unit 17 stores the progress status information, in which the status of progress of the video game based on control of the character is expressed, in the specific storage region associated with a progress status (the fifth storage region); and the condition determining unit 18 determines whether the progress condition regarding progress of the video game is satisfied or not on the basis of the progress status information stored in the fifth storage region. Therefore, it becomes possible to improve interest of the user in the video game by causing the content of action that the character is caused to carry out to have the variety.

Fifth Embodiment

Figure 12:
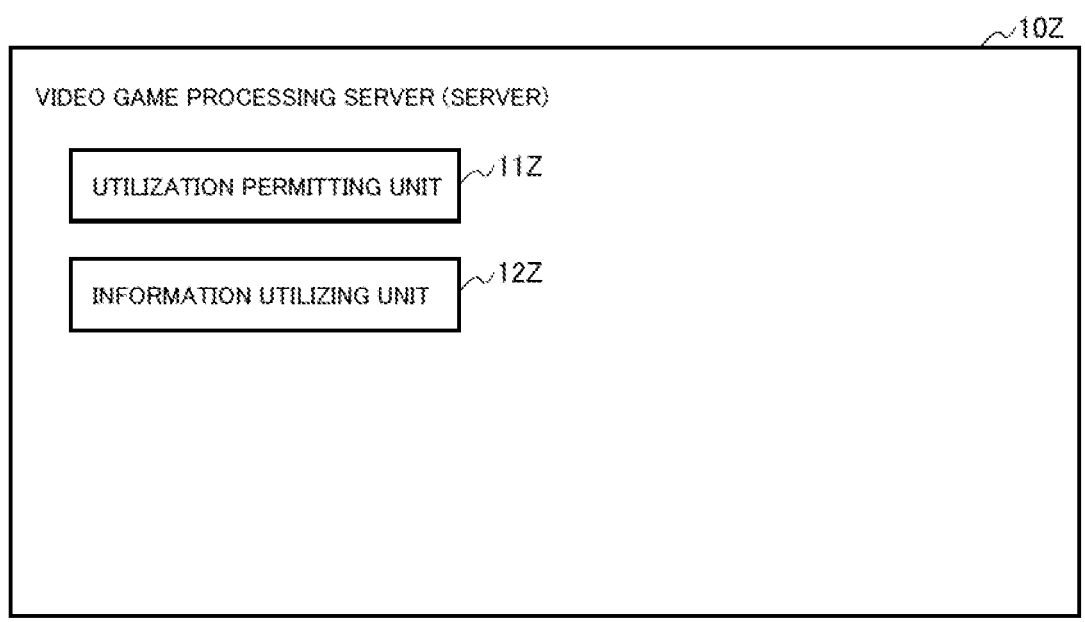
FIG. 12 is a block diagram illustrating a configuration of a server corresponding to at least one of the embodiments of the present disclosure.

FIG. 12 is a block diagram illustrating a configuration of a video game processing server 10Z (hereinafter, referred to as a "server 10Z"), which is an example of the video game processing server 10 in the video game processing system 100 (see FIG. 1). In the present embodiment, the server 10Z at least includes a utilization permitting unit 11Z and an information utilizing unit 12Z.

The utilization permitting unit 11Z has a function to permit utilization of object property information for controlling a character. A property of an object, which is stored in a specific storage region (hereinafter, referred to as a "first storage region") associated with the object, is expressed in the object property information.

Here, the object means a virtual object that appears in a video game. Hereinafter, a case where the object is an item such as a sword, a torch, or a ball will be described as an example.

Further, the first storage region means a specific storage region that is associated with an object and in which predetermined information can be stored. In this regard, the utilization permitting unit 11Z may be configured so that the first storage region at least stores object property information by which the associated object can be identified. Hereinafter, a case where the first storage region is a slot that can store tags up to a predetermined number will be described as an example.

Further, the object property information means information in which a property of an object is expressed. The object property information is stored in the first storage region associated with each object. As described above, in the present embodiment, the object property information is a tag stored in a slot that is associated with each item. In the present embodiment, the tag is information indicated by a character string. Each tag used in the video game is defined and managed as a tag in all tag list. For example, the server 10Z may be configured so as to use a tag for controlling a character in a case where the tag whose utilization is permitted for controlling the character is a tag that is included in the all tag list. On the other hand, the server 10Z may be configured so as not to use a tag for controlling a character and notify developers or a user of an error message in a case where the tag whose utilization is permitted for controlling the character is a tag that is not included in the all tag list.

In this regard, the first storage region may store at least the object property information by which the associated object can be identified. Hereinafter, a case where the object property information by which the associated object can be identified is a dedicated tag will be described as an example. In that case, for example, a dedicated tag of an object "apple" is an "apple".

Further, the first storage region may be capable of storing plural similar kinds of object property information. In the present embodiment, a plurality of tags "sweet" can be stored in a slot of the object "apple".

Further, the character means something that appears in the video game to take an action. The character includes something that takes an action on the basis of a user operation and something that autonomically takes an action regardless of a user operation. In particular, the character in the present embodiment is a character that autonomically takes an action regardless of a user operation. The character that autonomically takes an action is not limited particularly. Such a character may be a non-player character (hereinafter, referred to as an "NPC") that does not completely receive an operation of the user in the video game, or may be a character that receives an operation of the user in a partial status and does not receive an operation of the user in the other status. Hereinafter, a case where the character is the NPC will be described as an example. In the present embodiment, the NPC recognizes an object in the video game to make a decision, and carries out an action. The phrase "make a decision" or "decision making" herein means that a concrete action to be taken by the NPC is determined or decided.

Further, the utilization of the object property information for controlling the character means that the object property information is utilized in a process of controlling the character. In the present embodiment, the utilization of the object property information for controlling the character is that the tag stored in the slot of the object is utilized for controls such as recognition of the object by the character and the decision making.

The information utilizing unit 12Z has a function to utilize the object property information, whose utilization is permitted, for controlling the character.

Here, timing when the object property information is utilized is not limited particularly. The object property information may be utilized at the time of an action of the character against the object for which utilization of the object property information is permitted, or may be utilized at the time of an event in which the object does not appear or an action against another object.

Further, the server 10Z may be configured so as to store the object property information whose utilization is permitted in a specific storage region associated with the character (hereinafter, referred to as a "second storage region"). Here, the second storage region means a specific storage region that is associated with the character and in which predetermined information can be stored. The second storage region is associated with each character. Further, the server 10Z may be configured so as to specify object property information to be utilized for controlling the character from at least one kind of object property information stored in the second storage region. In this regard, the object property information whose utilization is permitted for controlling the character may be one that is stored in the first storage region associated with an object that satisfies a predetermined storage condition. Hereinafter, a case where the second storage region is a slot associated with the character (hereinafter, referred to as a "storage slot") will be described as an example. A tag whose utilization is permitted is stored in the storage slot, and is utilized for controlling the character. By configuring the server 10Z in this manner, it becomes possible to control the character as if the character holds its own memory.

Moreover, the server 10Z may be configured so as to calculate an evaluation value associated with each of the at least one kind of object property information stored in the second storage region in accordance with a predetermined evaluation rule, and specify object property information to be utilized for controlling the character on the basis of the calculated evaluation value. Here, the evaluation rule means a rule for calculating an evaluation value of each kind of object property information stored in the second storage region. Further, a configuration to calculate the evaluation value is not limited particularly. However, it is preferable that the server 10Z is configured so as to calculate the evaluation value on the basis of the order or the number of times the utilization of each tag is permitted.

Further, the second storage region may include a specific storage region, for which an upper limit of a storageable number of object property information to be stored by a FIFO (First In First Out) method is defined (hereinafter, referred to as a "third storage region"), and a specific storage region, which is different from the third storage region, for storing permission information associated with the object property information whose utilization is permitted (hereinafter, referred to as a "fourth storage region"). Here, the permission information means information regarding execution of a permitting process for utilization of the object property information. Hereinafter, a case where the third storage region is a short-term memory area of the character and the fourth storage region is a long-term storage area of the character will be described as an example. By configuring the server 10Z in this manner, it is possible to give the character a function having a relationship similar to a relationship between hippocampus and cerebral cortex in a human brain, and this makes it possible to cause behavior of the character as viewed from the user to become closer to that of a human.

Here, the server 10Z may be configured so as to store the object property information whose utilization is permitted in the third storage region, and update the permission information associated with the object property information stored in the fourth storage region. Here, the server 10Z may be configured so as to specify object property information to be utilized for controlling the character from at least one kind of object property information stored in at least any of the third storage region and the fourth storage region. A configuration to update the permission information is not limited particularly. However, it is preferable that the server 10Z is configured to update the permission information in accordance with the number of times the permitting process for utilization of each kind of object property information is executed.

In this regard, whether the object property information stored in the third storage region or the object property information stored in the fourth storage region is emphasized when an action carried out by the character is specified is not limited particularly. For example, the server 10Z may be configured so as to give a weight in calculation of an evaluation value so that an evaluation value associated with the object property information stored in the third storage region becomes higher than an evaluation value associated with the object property information stored in the fourth storage region.

Further, the permission information may be information that indicates a permission value according to the number of times the utilization is permitted. Here, the server 10Z may be configured so as to update the information that indicates the permission value of the object property information whose utilization is permitted in accordance with the number of times the utilization is permitted. Moreover, the server 10Z may be configured so as to specify, in the third storage region, object property information to be utilized for controlling the character from at least one kind of stored object property information (here, a plural kinds of object property information) on the basis of the storage order of the at least one kind of object property information, and specify, in the fourth storage region, object property information to be utilized for controlling the character from at least one kind of stored object property information on the basis of the permission value of each of the at least one kind of object property information. Here, a configuration to specify the object property information in the third storage region is not limited particularly. However, it is preferable that the server 10Z is configured so as to specify the object property information on the basis of a calculation result of an evaluation value of each kind of object property information. In this regard, a configuration to calculate the evaluation value in the third storage region is not limited particularly. It is preferable that the server 10Z is configured to calculate the evaluation value so that that of object property information with a new storage order is higher than that of object property information with an old storage order. Further, a configuration to specify the object property information in the fourth storage region is not limited particularly. However, it is preferable that the server 10Z is configured so as to calculate an evaluation value of each kind of object property information on the basis of the permission value thereof, and specify the object property information on the basis of the evaluation value thereof.

Further, the server 10Z may be configured so as to select a target that has one or more kind of object property information on the basis of a matching degree between any kind of object property information possessed by the target and the object property information stored in the second storage region. Here, a configuration to select a target is not limited particularly. However, it is preferable that the server 10Z is configured so s to select the target as a target of an action. As an example of the target, there are an object and a non-object (for example, a topic or a concept).

Further, as examples of a configuration to measure a matching degree of object property information, there are a configuration in which a matching degree is measured on the basis of a ratio of the same object property information as the object property information stored in the second storage region (hereinafter, referred to as "matched property information") in one or more kind of object property information possessed by the target, and a configuration in which a matching degree is measured on the basis of the sum of predetermined values (hereinafter, referred to as "storage intensity values") on each kind of matched property information. Here, as examples of a configuration to calculate a storage intensity value of each kind of matched property information in a case where the second storage region includes the third storage region and the fourth storage region, there are a configuration in which a value corresponding to a storage order of the same object property information as the matched property information in the third storage region is calculated as the storage intensity value of the matched property information, and a configuration in which the storage intensity value of the matched property information is calculated on the basis of the permission value of the same object property information as the matched property information in the fourth storage region.

In the present embodiment, the target may be an item. In that case, the character utilizes an item that has a high matching degree between a tag possessed by the item and a tag held as the memory of the character.

Further, in the present embodiment, there may be object property information that is not associated with a specific object. Further, in the present embodiment, the target may be a topic. In that case, the character talks on a topic that has a high matching degree between a tag possessed by the topic and a tag held as the memory of the character.

In this regard, in addition, the function regarding the object among the functions realized or performed by the server 10Z can be applied to those other than the objects.

In this regard, the server 10Z may be configured so as to specify object property information on the basis of the object property information stored in each of the third storage region and the fourth storage region associated with the character without utilizing the object property information stored in the first storage region in a process of specifying object property information to be utilized for controlling the character from the kinds of object property information stored in the third storage region and the fourth storage region described above. Moreover, the server 10Z may be configured so as to cause the character to carry out an action determined on the basis of the specified object property information. Weighting in calculation of the evaluation value of the object property information stored in each of the third storage region and the fourth storage region is not limited particularly. The weighting may be executed to calculate the evaluation values so that the evaluation value of the object property information stored in any one of the third storage region or the fourth storage region is larger than the evaluation value of the object property information stored in the other.

Further, in a case where the same object property information is stored in both the third storage region and the fourth storage region (in case of the fourth storage region, it is determined whether it is stored by the permission information or not), the process of specifying object property information may be executed in consideration of the permission values calculated in both the third storage region and the fourth storage region. For example, the sum of the permission values calculated in the both may be utilized for the process of specifying object property information. By configuring the server 10Z in this manner, it becomes possible to cause the character to carry out an active action (or recollection) that does not require recognition of the object.

Further, the server 10Z may be configured so as to search action content associated with the object property information whose utilization is permitted from plural kinds of action content on the basis of action content related information in which information indicating action content of the character and object property information are associated with each other, and specify the searched action content as the content of an action that the character is caused to carry out. Hereinafter, a case where a topic containing a tag whose utilization is permitted is specified as a topic about which the character talks on the basis of a topic list in which information indicating a topic of the character and a tag are associated with each other will be described as an example. In this regard, the server 10Z may be configured so as to search action content associated with predetermined object property information. Here, the predetermined object property information is not limited particularly. However, it is preferable that the predetermined object property information is object property information by which the object can be identified. In the present embodiment, a topic containing a dedicated tag whose utilization is permitted for the object is searched from the topic list, and the searched topic is specified as a topic that the character is caused to talk on (primary association).

Further, the server 10Z may be configured so as to search at least one kind of action content associated with at least any of plural kinds object property information among plural kinds of action content further on the basis of the plural kinds of object property information associated with the object. Here, the server 10Z specifies the action content that the character is caused to carry out on the basis of an evaluation value calculated from the object property information associated with the action content among the at least one kind of action content thus searched. In the present embodiment, a topic containing a normal tag whose utilization is permitted for the object is searched from the topic list. Further, in the present embodiment, an evaluation value (or a storage intensity value) of the topic is calculated, and any topic is specified as a topic that the character talks on on the basis of a calculation result (secondary association).

Further, the server 10Z may be configured so as to search at least one kind of action content associated with at least any of the object property information associated with another object, which contains the object property information associated with the object. Here, the server 10Z specifies the action content that the character is caused to carry out on the basis of an evaluation value calculated from object property information associated with the action content among the at least one kind of action content thus searched. In the present embodiment, any other object including the normal tag whose utilization is permitted for the object is searched, and a topic containing the normal tag included in the other object is searched from the topic list. Further, in the present embodiment, an evaluation value (or a storage intensity value) of the topic is calculated, and any topic is specified as a topic that the character talks on on the basis of a calculation result (tertiary association).

In this regard, the server 10Z may be configured so as to specify the other object from specific objects at least once via the object property information on the basis of the object property information whose utilization is permitted. Namely, the server 10Z may be configured so as to specify an object in which the same object property information as the object property information whose utilization is permitted is stored in the first storage region.

In the present embodiment, for example, in a case where utilization of a tag "sweet" possessed by an object "apple" is permitted, an object "mandarin orange" possessing the same tag as the tag "sweet" possessed by the object "apple" is specified. In this way, the chaining associates the object "mandarin orange" from the object "apple". Further, the tag may be passed through twice or more. Hereinafter, an example in which the tag is be passed through twice will be described. First, in a case where utilization of the tag "sweet" possessed by the object "apple" is permitted, an object "banana" that has the same tag as the tag "sweet" possessed by the object "apple" is specified. Next, an object "bat" that has the same tag as another tag "elongated" possessed by the object "banana" (which is preferably a tag that the object "apple" does not possess) is specified. In this way, the chaining associates the object "bat" from the object "apple".

Further, the server 10Z may be configured so as to specify another object via information regarding a shape of an object that has the shape. Namely, the server 10Z may be configured so as to specify, on the basis of the information regarding the shape of the object, an object with a shape that has a predetermined relationship with the shape. As an example of the predetermined relationship, there is a relationship that the whole or a part of shapes of objects are similar to each other (a degree of similarity is a predetermined degree or higher). In this regard, the specified object may be a target of an action to be carried out by the character, for example.

Further, the server 10Z may be configured so as to store progress status information, in which a status of progress of the video game based on control of the character is expressed, in a specific storage region associated with a progress status (hereinafter, referred to as a "fifth storage region"). Here, the server 10Z determines whether a progress condition regarding progress of the video game is satisfied or not on the basis of the progress status information stored in the fifth storage region. In the present embodiment, a progress condition of a scenario in the video game becomes a condition that a tag in which a predetermined status is expressed is stored in a tag slot for managing the scenario. In a case where the progress condition is satisfied, the scenario proceeds to a next stage, and a new event occurs. More specifically, for example, the progress condition is a condition that a "tag A", a "tag B", a "tag C", and a "tag D" are stored in the tag slot for managing the scenario. In that case, when all the tag A to the tag D are stored in the tag slot for managing progress of the scenario, the scenario proceeds. Here, an event corresponding to the tag A to the tag D may be one that can store a plurality of tags among the tag A to the tag D. By preparing a plurality of events each of which can store the same tag, it is possible to improve a degree of freedom in capturing the scenario.

In this regard, the server 10Z may be configured so as to determine whether the character for the object is caused to carry out an action or not on the basis of the object property information stored in the first storage region associated with the object. A configuration to determine whether the character for the object is caused to carry out an action or not is not limited particularly. However, it is preferable that the server 10Z is configured so as to determine that an action corresponding to the object property information stored in the first storage region associated with the object is carried out. In the present embodiment, whether the character carries out the action for the object or not is determined on the basis of a tag of an object discovered by the character.

Further, the server 10Z may be configured so as to determine whether the character clears an event associated with a specific storage region (hereinafter, referred to as a "sixth storage region") in which predetermined progress status information is stored or not. Namely, the server 10Z may be configured so as to determine that the character clears an event associated with a clear condition that the predetermined progress status information is stored in the sixth storage region in a case where the clear condition is satisfied. Here, the number of kinds of the predetermined progress status information may be singular or plural. In this regard, a configuration in a case where a clear condition is that plural kinds of predetermined progress status information are stored in the sixth storage region is not limited particularly. However, it is preferable that the server 10Z is configured so as to determine whether the clear condition is satisfied or not regardless of the order of the stored kinds of progress status information. Further, the clear condition may be a condition that a predetermined number of kinds of progress status information of plural kinds of predetermined progress status information are stored in the sixth storage region.

FIG. 13 is an explanatory table for explaining an example of a storage state of information stored in a storage unit (not illustrated in the drawings) included in the server 10Z. As illustrated in FIG. 13, the storage unit stores therein an object name, a dedicated tag and normal tags in the first storage region as information regarding objects (that is, object property related information) so as to be associated with each other.

The object name means information indicating a name of an object.

Further, the dedicated tag in the first storage region means a tag by which an object can be identified. In the present embodiment, the dedicated tag is character string information similar to the object name.

Further, each of the normal tags in the first storage region is a tag different from the dedicated tag, and means information in which a property of the object is expressed. In the present embodiment, each of the normal tags is information in which the property of the object is indicated by a character string. Further, in the present embodiment, the normal tags are stored in the first storage region up to the maximum of eight for one object. In this regard, in the present embodiment, four tags "sweet" are stored in the first storage region as normal tags of an object "apple B". Here, when a tag is utilized for controlling the character, the object "apple B" may be treated as sweeter than an object "apple A" for which one tag "sweet" is stored in the first storage region. By allowing a plurality of the same tags to be stored in this manner, it becomes possible to provide a difference between properties common to objects of the same type (that is, objects having the same dedicated tag).

FIGS. 14A and 14B are explanatory tables for explaining an example of a storage state of information stored in the storage unit (not illustrated in the drawings) included in the server 10Z. FIG. 14A is an explanatory table for explaining a storage state of information regarding a short-term memory area corresponding to the third storage region of the character. As illustrated in FIG. 14A, the storage unit stores therein a character name, and tags stored in the short-term memory area so as to be associated with each other as character short-term memory related information regarding short-term memory of the character.

The character name means information indicating a name of the character.

Each of a tag 1 to a tag 8 means a tag stored in the short-term memory area of the character. The tags are stored in a new order from the tag 1. The tag 8 is the earliest stored tag among the tags stored in the short-term memory area. In the present embodiment, tags whose utilization is permitted are respectively stored in the tag 1 to the tag 8.

FIG. 14B is an explanatory table for explaining an example of a storage state of information regarding a long-term storage area corresponding to the fourth storage region of the character. As illustrated in FIG. 14B, the storage unit stores therein a character name, and information regarding each tag stored I the long-term storage area so as to be associated with each other as character long-term memory related information regarding long-term memory of the character.

The character name means information indicating a name of a character.

Each of a tag 1 to a tag N means information that indicates a tag stored in the long-term storage area of the character and the number of times each tag is permitted. In the present embodiment, numeral information indicating the number of times utilization of each of all the tags (the tag 1 to the tag N) to be utilized in the video game is permitted for the character.

Next, an operation of a video game processing system 100Z (hereinafter, referred to as a "system 100Z"; not illustrated in the drawings), which is an example of the video game processing system 100 (see FIG. 1), will be described. The system 100Z includes the server 10Z. Hereinafter, in order to simplify explanation thereof, a case where the system 100Z executes processes executed by any of the server 10Z and a user terminal 20 (hereinafter, referred to as a "terminal 20") will be described.

Figure 15:
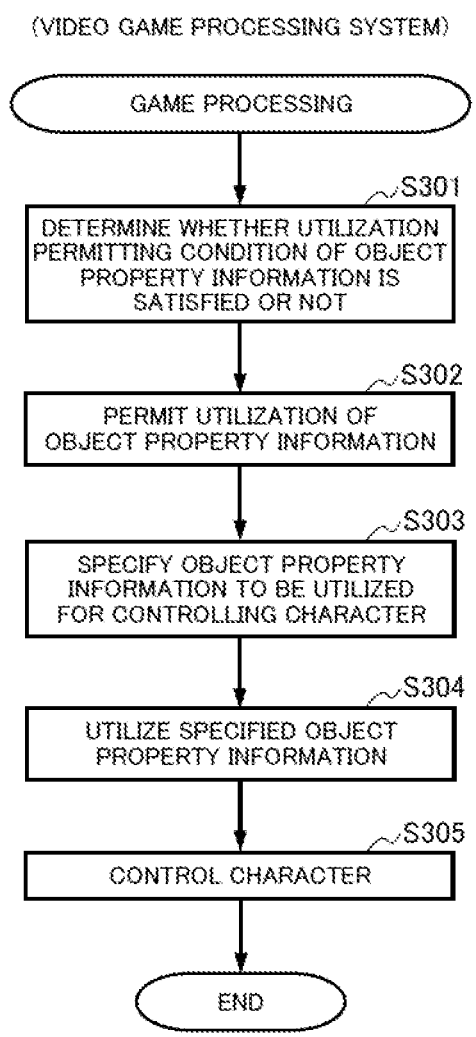
FIG. 15 is a flowchart illustrating an example of game processing corresponding to at least one of the embodiments of the present disclosure.

FIG. 15 is a flowchart illustrating an example of game processing executed by the system 100Z. In the game processing according to the present embodiment, processes related to a control of progress of a video game using the positional information of the terminal 20 in response to an operation of the user are executed. Hereinafter, each of the processes will be described. In this regard, the order of the processes may be changed without any contradiction or the like of processing content.

The game processing is started as an opportunity that the user carries out an input of a condition into the terminal 20 accessing the server 10Z, for example.

In the game processing, the system 100Z first determines whether a condition for permitting utilization of object property information is satisfied or not (Step S301). In the present embodiment, the system 100Z determines whether a condition that a character recognizes an object is satisfied or not.

When it is determined that the condition is satisfied, the system 100Z permits utilization of the object property information, in which a property of an object stored in a specific storage region associated with the object (that is, a first storage region) is expressed, for controlling the character (Step S302). In the present embodiment, the system 100Z permits a tag stored in a slot of the object to be utilized for controls such as recognition of the object by the character and decision making.

When utilization of the object property information is permitted, the system 100Z specifies object property information to be utilized for controlling the character (Step S303). In the present embodiment, the system 100Z specifies, as a target, the same object property information as the object property information stored in the first storage region associated with the object that satisfies a recognition condition.

When the object property information is specified, the system 100Z utilizes the specified object property information for controlling the character (Step S304). In the present embodiment, the system 100Z utilizes a specified tag for determining an action of the character.

When the object property information is utilized, the system 100Z controls the character on the basis of the object property information (Step S305). In the present embodiment, the system 100Z controls the action of the character based on the tag against the object.

In the present embodiment, when the character is controlled, the system 100Z terminates the processes herein.

Figure 16A:
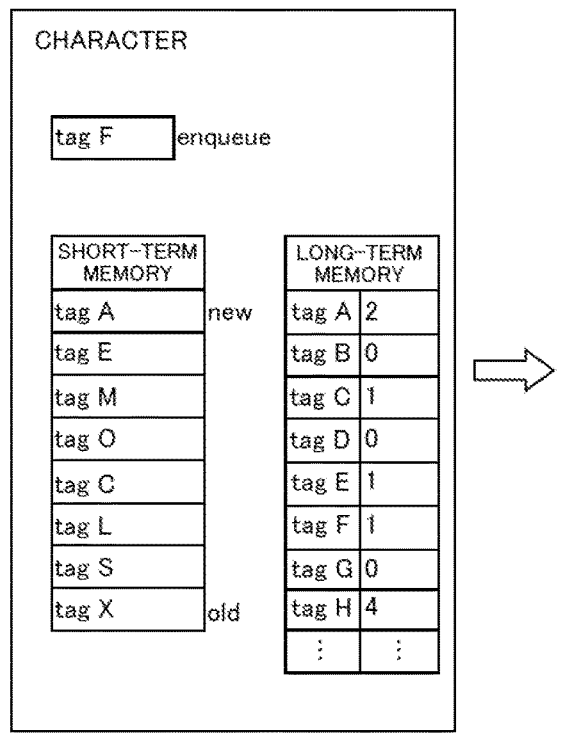
FIGS. 16A and 16B are explanatory diagrams illustrating an example of game processing corresponding to at least one of the embodiments of the present disclosure.
Figure 16B:
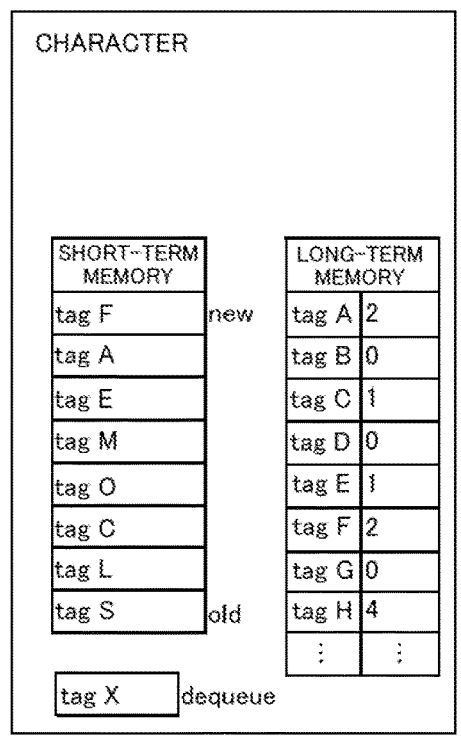

FIGS. 16A and 16B are explanatory diagrams for explaining an example in which object property information is stored in a second storage region. FIG. 16A is a view in a case where a character is about to memorize a tag. As illustrated in FIG. 16A, a short-term memory area corresponding to a third storage region and a long-term storage area corresponding to a fourth storage region are associated with the character. Here, tags are stored in the short-term memory area in a queue (a FIFO method). Further, the number of times utilization of each of all tags is permitted is stored in the long-term storage area.

FIG. 16B is a view of a result by memorizing the tags by the character. Here, in the short-term memory area, a tag F is stored, and a tag X is deleted. On the other hand, in the long-term storage area, the number of times utilization of the tag F is permitted increases by one. Thus, the oldest tag is deleted when a new tag is stored in the short-term memory area, while the number of times of permission utilization is permitted for all the tags increases in the long-term storage area.

FIGS. 17A and 17B are explanatory tables for explaining an example in which the content of an action that a character is caused to carry out on the basis of action content related information is specified. Specifically, an example in which a topic to be spoken by a character is specified will be described with reference to FIGS. 17A and 17B. FIG. 17A illustrates tags possessed by an object "apple". A dedicated tag herein is an "apple". FIG. 17B illustrates a topic list that the character may speak. Here, a case where utilization of the tags of the object "apple" is permitted will be described. For example, a topic "harvest festival" containing the dedicated tag "apple" possessed by the object "apple" may be specified as a topic that the character is caused to talk on. Further, for example, a topic containing a normal tag possessed by the object "apple" may be specified as a topic that the character is caused to talk on. In this regard, in the example illustrated in FIG. 17B, a plurality of topics each containing a normal tag exists. Therefore, the topic that the character is caused to talk on is specified by using an evaluation value calculated for each topic. Further, in the example illustrated in FIGS. 17A and 17B, any other object that has the normal tag possessed by the object "apple" may be specified, and a topic containing a tag possessed by the other object may be specified as the topic that the character is caused to talk on.

Figure 18:
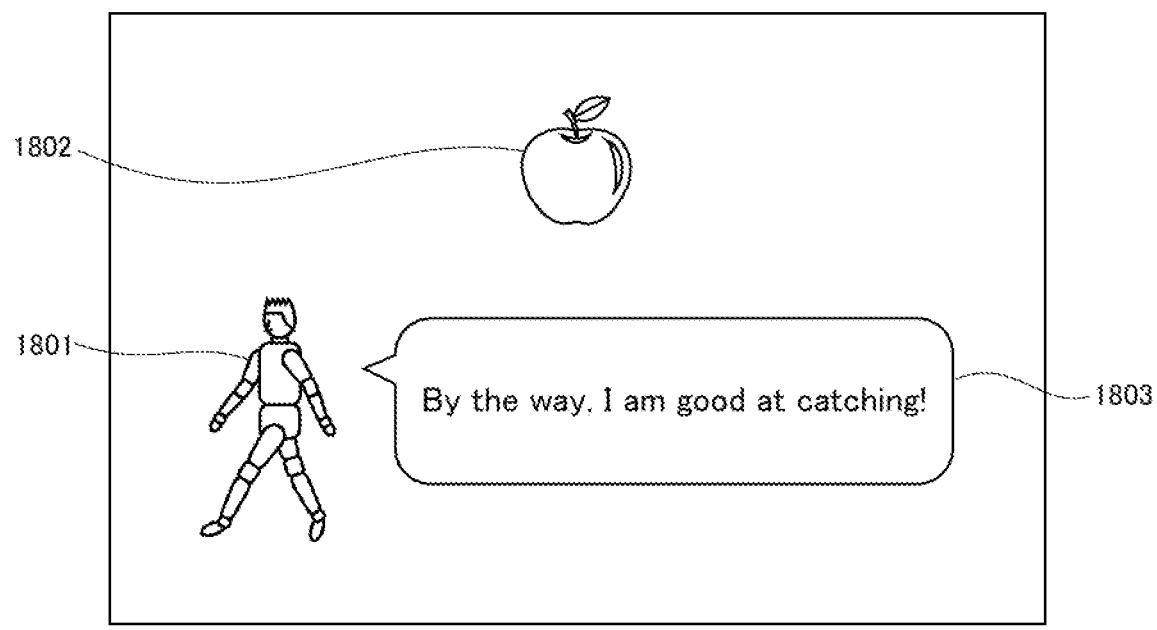
FIG. 18 is an explanatory diagram illustrating an example of a display screen corresponding to at least one of the embodiments of the present disclosure.

FIG. 18 is an explanatory diagram illustrating an example of a game screen in a case where a character is caused to carry out an action with the content specified on the basis of the action content related information. Specifically, FIG. 18 illustrates a game screen in a case where the character talks on a topic "catch" specified on the basis of tags possessed by a topic (that is, in case of the secondary association). A character 1801, an apple object 1802, and a message 1803 are illustrated in FIG. 18. Here, the character 1801 is a character that autonomically recognizes an object and carries out an action. The character 1801 recognizes the apple object 1802, and associates it with the topic "catch". Then, the character 1801 talks on the topic "catch" thus associated (here, the message 1803 is displayed). In this regard, in case of the primary association, the topic "harvest festival" is specified, and the character talks on the topic "harvest festival". Further, in case of the tertiary association, as described above, further association is carried out, and the character can talk on a topic other than the topic "catch" and the topic "harvest festival".

As explained above, as one side of the fifth embodiment, the server 10Z that controls progress of the video game in response to the operation of the user is configured so as to at least include the utilization permitting unit 11Z and the information utilizing unit 12Z. Thus, the utilization permitting unit 11Z permits the utilization of the object property information (for example, the tag), in which the property of the object that is stored in the specific storage region (the first storage region, for example, the slot) associated with the object (for example, the item) is expressed, for controlling the character; and the information utilizing unit 12Z utilizes the object property information, whose utilization is permitted, for controlling the character (for example, utilization of the item in a method of specifying the character). Therefore, it becomes possible to reduce the burden on developers when setting and utilizing information regarding the property of the object in the video game.

Namely, it is not necessary for the developers to set in advance whether each object has each property (or each attribute) in the form of a flag or the like. Therefore, it becomes possible to easily set and manage the properties of the object. Further, in a case where a property is added newly, it is only necessary to set the object property information for the object that has the property. Moreover, becomes possible to cause progress of the video game to which the object is related to exceed expectation of the developers (that is, it is possible for the user to obtain results of progress of the video game, which exceeds the number of results that the developers can manage). Namely, it becomes possible to realize a number of game states that the developers cannot manage.

Further, in the example of the fifth embodiment described above, the server 10Z is configured so as to: store object property information whose utilization is permitted in a specific storage region associated with the character (that is, the second storage region, for example, the storage slot); and specify the object property information to be utilized for controlling the character from at least one kind of object property information stored in the second storage region. Therefore, it becomes possible to reproduce a mechanism of memory of human, and this makes it possible to realize a more tasteful character control.

Further, in the example of the fifth embodiment described above, the server 10Z is configured so as to: search the action content associated with the object property information whose utilization is permitted from plural kinds of action content on the basis of action content related information in which information indicating the action content of the character (for example, a topic) and the object property information are associated with each other; and specify the searched action content as the content of an action that the character is caused to carry out. Therefore, it becomes possible to improve interest of the user in the video game by causing the content of the action carried out by the character to have the variety.

Further, in the example of the fifth embodiment described above, the server 10Z is configured so as to: store the progress status information, in which the status of progress of the video game based on control of the character (for example, a status of scenario progress) is expressed, in the specific storage region associated with the progress status (that is, the fifth storage region); and determine whether the progress condition regarding progress of the video game is satisfied or not on the basis of the progress status information stored in the fifth storage region. Therefore, it becomes possible to improve interest of the user in the video game by causing the content of the action to be carried out by the character to have the variety.

As explained above, one shortage or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, and 201 to 20N and the server 10 executes the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20, and 201 to 20N (for example, the user terminal 20) executes a part or all of the processes that have been explained as the processes executed by the server 10. Further, the system 100 may be configured so that a part or all of the storage unit included in the server 10 is included in any of the plurality of user terminals 20, and 201 to 20N. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

APPENDIX

The explanation of the embodiments described above has been described so that the following disclosure can be at least performed by a person having a normal skill in the art to which the present disclosure belongs.

(1)

A non-transitory computer-readable medium including a video game processing program for causing a server to perform functions to control a character in progress of a video game, the functions comprising:

a utilization permitting function configured to permit utilization of object property information for controlling the character, a property of an object being expressed in the object property information, the property of the object being stored in a specific storage region associated with the object as a first storage region; and an information utilizing function configured to utilize the object property information, whose utilization is permitted, for controlling the character.

(2)

The non-transitory computer-readable medium according to (1), the functions further comprising:

a first information storing function configured to store the object property information, whose utilization is permitted, in a specific storage region associated with the character as a second storage region; and an information specifying function configured to specify object property information to be utilized for controlling the character from at least one kind of object property information stored in the second storage region.

(2-1)

The non-transitory computer-readable medium according to (2), the functions further comprising:

an evaluation value calculating function configured to calculate an evaluation value associated with each of the at least one kind of object property information stored in the second storage region in accordance with a predetermined evaluation rule, and wherein the information specifying function includes a function configured to specify the object property information to be utilized for controlling the character on a basis of the calculated evaluation value.

(2-2)

The non-transitory computer-readable medium according to (2) or (2-1), wherein the second storage region includes a third storage region and a fourth storage region, the third storage region being a specific storage region for which an upper limit of a storageable number of object property information to be stored by a FIFO method is defined, the fourth storage region being different from the third storage region, the fourth storage region being a specific storage region for storing permission information associated with the object property information whose utilization is permitted, wherein the first information storing function includes a function configured to store the object property information whose utilization is permitted in the third storage region, and further update the permission information associated with the object property information and stored in the fourth storage region, and wherein the information specifying function includes a function configured to specify the object property information to be utilized for controlling the character from at least one kind of object property information stored in at least any of the third storage region and the fourth storage region.

(2-3)

The non-transitory computer-readable medium according to (2-2), wherein the permission information is information that indicates a permission value according to a number of times the utilization is permitted, wherein the first information storing function includes a function configured to update the information that indicates the permission value of the object property information whose utilization is permitted in accordance with the number of times the utilization is permitted, wherein the information specifying function includes:

a function configured to specify the object property information to be utilized for controlling the character from plural kinds of object property information on a basis of a storage order of the at least one kind of object property information stored in the third storage region; and a function configured to specify the object property information to be utilized for controlling the character from at least one kind of object property information on a basis of the permission value of each of the at least one kind of object property information stored in the fourth storage region.

(2-4)

The non-transitory computer-readable medium according to any one of (2) to (2-3), the functions further comprising:

a function configured to select a target that has one or more kind of object property information on a basis of a matching degree between any kind of object property information possessed by the target and the object property information stored in the second storage region.

(3)

The non-transitory computer-readable medium according to (1) or (2), the functions further comprising:

a searching function configured to search action content associated with the object property information whose utilization is permitted among plural kinds of action content on a basis of action content related information in which information indicating action content of the character and corresponding object property information are associated with each other; and an action specifying function configured to specify the searched action content as content of an action that the character is caused to carry out.

(3-1)

The non-transitory computer-readable medium according to (3), wherein the searching function includes a function configured to search action content associated with predetermined object property information.

(3-2)

The non-transitory computer-readable medium according to (3) or (3-1), wherein the searching function includes a function configured to search at least one kind of action content associated with at least any of the plural kinds of action content further on a basis of plural kinds of object property information associated with the object, and wherein the action specifying function includes a function configured to specify action content that the character is caused to carry out on a basis of an evaluation value calculated from object property information associated with certain action content of the searched at least one kind of action content.

(3-3)

The non-transitory computer-readable medium according to any one of (3) to (3-2), wherein the searching function includes a function configured to search at least one kind of action content associated with at least any of object property information associated with another object, the object property information containing plural kinds of object property information associated with the object, an wherein the action specifying function includes a function configured to specify action content that the character is caused to carry out on a basis of an evaluation value calculated from object property information associated with certain action content of the searched at least one kind of action content.

(4)

The non-transitory computer-readable medium according to any one of (1) to (3), the functions further comprising:

a second information storing function configured to store progress status information in a specific storage region as a fifth storage region, a status of progress of the video game based on control of the character being expressed in the progress status information, the fifth storage region being associated with the progress status; and a condition determining function configured to determine whether a progress condition regarding progress of the video game is satisfied or not on a basis of the progress status information stored in the fifth storage region.

(5)

The non-transitory computer-readable medium according to any one of (1) to (4), wherein an upper limit of a storage number of the object property information is defined in the first storage region.

(6)

The non-transitory computer-readable medium according to any one of (1) to (5), wherein at least object property information by which an object associated with the first storage region can be identified is stored in the first storage region.

(7)

The non-transitory computer-readable medium according to any one of (1) to (6), wherein the first storage region is allowed to store plural kinds of similar object property information therein.

(8)

A non-transitory computer-readable medium including a video game processing program for causing a user terminal to perform at least one function of the functions that the video game processing program described in any one of (1) to (7) causes the server to perform, the user terminal being capable of communicating with the server.

(9)

A video game processing system for controlling progress of a video game in response to an operation of a user, the video game processing system comprising a communication network, a server, and a user terminal, the user terminal comprising:

a utilization permitter configured to permit utilization of object property information for controlling the character, a property of an object being expressed in the object property information, the property of the object being stored in a specific storage region associated with the object as a first storage region; and an information utilizer configured to utilize the object property information, whose utilization is permitted, for controlling the character.

(10)

The video game processing system according to (9), wherein the server includes the utilization permitter and the information utilizer, and wherein the user terminal includes an output controller configured to output a game screen to a display screen of a display device, the game screen indicating a state of the character.

(11)

A non-transitory computer-readable medium including a video game processing program for causing a user terminal to perform functions to control progress of a video game in response to an operation of a user, the functions comprising:

a utilization permitting function configured to permit utilization of object property information for controlling the character, a property of an object being expressed in the object property information, the property of the object being stored in a specific storage region associated with the object as a first storage region; and an information utilizing function configured to utilize the object property information, whose utilization is permitted, for controlling the character.

(12)

A video game processing method of controlling progress of a video game in response to an operation of a user, the video game processing method comprising:

a utilization permitting process configured to permit utilization of object property information for controlling the character, a property of an object being expressed in the object property information, the property of the object being stored in a specific storage region associated with the object as a first storage region; and an information utilizing process configured to utilize the object property information, whose utilization is permitted, for controlling the character.

(13)

A video game processing method of controlling progress of a video game in response to an operation of a user by a video game processing system, the video game processing system comprising a communication network, a server, and a user terminal, the video game processing method comprising:

a utilization permitting process configured to permit utilization of object property information for controlling the character, a property of an object being expressed in the object property information, the property of the object being stored in a specific storage region associated with the object as a first storage region; and an information utilizing process configured to utilize the object property information, whose utilization is permitted, for controlling the character.

INDUSTRIAL APPLICABILITY

According to one of the embodiments of the present disclosure, it is useful to be capable of reducing the burden on developers when information regarding a property of an object in a video game is set or utilized.

What is claimed is:

1. A non-transitory computer-readable medium storing a video game processing program for causing a server to perform functions to control a character in progress of a video game, the functions comprising:

permitting utilization of object property information for controlling the character, the object property information being stored in a first storage region associated with an object and being configured to express a property of the object;

storing the object property information, whose utilization is permitted, in a second storage region associated with the character;

calculating an evaluation value associated with the object property information stored in the second storage region;

specifying object property information to be utilized for controlling the character from the object property information stored in the second storage region based on the calculated evaluation value; and utilizing the specified object property information for controlling the character.

2. The non-transitory computer-readable medium according to claim 1, wherein calculating the evaluation value includes calculating the evaluation value in accordance with a predetermined evaluation rule.

3. The non-transitory computer-readable medium according to claim 1, wherein the second storage region comprises:

a third storage region configured to store a plurality of kinds of object property information by a first-in-first-out (FIFO) method, an upper limit of a number of the kinds of object property information being defined; and a fourth storage region being different from the third storage region, configured to store permission information associated with the object property information whose utilization is permitted, wherein storing the object property information comprises:

storing the object property information whose utilization is permitted in the third storage region; and updating the permission information in the fourth storage region, and wherein specifying the object property information includes specifying the object property information from at least one kind of object property information stored in at least any of the third storage region and the fourth storage region.

4. The non-transitory computer-readable medium according to claim 3, wherein storing the object property information comprises updating the permission information that is configured to indicate a permission value according to a number of times the utilization is permitted, and wherein specifying the object property information includes at least one of:

specifying the object property information to be utilized for controlling the character from a plurality of kinds of object property information based on a storage order of the at least one kind of object property information stored in the third storage region; or specifying the object property information to be utilized for controlling the character from at least one kind of object property information based on the permission value of each of the at least one kind of object property information stored in the fourth storage region.

5. The non-transitory computer-readable medium according to claim 1, the functions further comprising:

selecting a target that has one or more kinds of object property information based on a matching degree between any kind of the one or more kinds of object property information of the target and the object property information stored in the second storage region.

6. The non-transitory computer-readable medium according to claim 1, the functions further comprising:

searching an action content associated with the object property information whose utilization is permitted among a plurality of action contents based on action content related information, the content related information comprising information indicative of an action content of the character and corresponding object property information; and specifying the searched action content indicative of an action that the character is caused to carry out.

7. The non-transitory computer-readable medium according to claim 6, wherein searching the action content includes searching action content associated with predetermined object property information.

8. The non-transitory computer-readable medium according to claim 6, wherein searching the action content includes searching at least one action content associated with at least any of the plurality of action contents further based on a plurality of kinds of object property information associated with the object, and wherein specifying the searched action content includes specifying action content that the character is caused to carry out based on an evaluation value calculated from object property information associated with each action content of the searched at least one action content.

9. The non-transitory computer-readable medium according to claim 6, wherein searching the action content includes searching at least one action content associated with any of object property information associated with another object, the object property information containing a plurality of kinds of object property information associated with the object, and wherein specifying the searched action content includes specifying action content that the character is caused to carry out based on an evaluation value calculated from object property information associated with each action content of the searched at least one action content.

10. The non-transitory computer-readable medium according to claim 1, the functions further comprising:

storing progress status information in a fifth storage region being associated with a status of progress of the video game that is based on control of the character being expressed in the progress status information; and determining whether a progress condition regarding progress of the video game is satisfied or not based on the progress status information stored in the fifth storage region.

11. The non-transitory computer-readable medium according to claim 1, wherein an upper limit of a number of the kinds of object property information is defined in the first storage region.

12. The non-transitory computer-readable medium according to claim 1, wherein at least object property information by which an object associated with the first storage region can be identified is stored in the first storage region.

13. The non-transitory computer-readable medium according to claim 1, wherein the first storage region is configured to store a plurality of kinds of similar object property information.

14. A video game processing system that is configured to control a character in progress of a video game, the video game processing system comprising:

a communication network;
a server; and
at least one user terminal configured to:

connect with the server via the communication network;

permit utilization of object property information for controlling the character, the object property information being stored in a first storage region associated with an object and being configured to express a property of the object;

store the object property information, whose utilization is permitted, in a second storage region associated with the character;

calculate an evaluation value associated with the object property information stored in the second storage region;

specify object property information to be utilized for controlling the character from the object property information stored in the second storage region based on the calculated evaluation value; and utilize the specified object property information for controlling the character.

15. A non-transitory computer-readable medium storing a video game processing program for causing a user terminal to perform functions to control a character in progress of a video game, the functions comprising:

permitting utilization of object property information for controlling the character, the object property information being stored in a first storage region associated with the object and being configured to express a property of the object;

storing the object property information, whose utilization is permitted, in a second storage region associated with the character;

calculating an evaluation value associated with the object property information stored in the second storage region;

specifying object property information to be utilized for controlling the character from the object property information stored in the second storage region based on the calculated evaluation value; and utilizing the specified object property information for controlling the character.

* * * * *